United States Patent [19]
Queen et al.

[11] Patent Number: 5,567,256
[45] Date of Patent: Oct. 22, 1996

[54] PROCESS OF MAKING COTTON ROOM-SIZE RUGS

[75] Inventors: Lawrence E. Queen, Greensboro, N.C.; Roy E. Guess, Roanoke, Va.

[73] Assignee: Burlington Industries, Inc., Greensboro, N.C.

[21] Appl. No.: 360,153

[22] Filed: Dec. 21, 1994

[51] Int. Cl.$^6$ ..................................... B32B 31/16
[52] U.S. Cl. .................. 156/72; 156/148; 156/308.4; 156/309.6; 428/96; 428/97
[58] Field of Search ................. 156/72, 148, 308.4, 156/309.6; 428/89, 95, 96, 97; 28/159, 160

[56] References Cited

U.S. PATENT DOCUMENTS

| | | |
|---|---|---|
| 4,045,605 | 8/1977 | Breens et al. |
| 4,668,552 | 5/1987 | Scott et al. |
| 4,753,693 | 6/1988 | Street |
| 5,010,723 | 4/1991 | Wilen |

OTHER PUBLICATIONS

A. P. S. Sawhney, *International Textile Bulletin*, "Some Novel Ring–Spun Yarn Structures," Mar. 1990.

*Nonwovens Markets and Fiber Structures Report*, "Cotton and low–melt PET combine for residential insulation product," Aug. 26, 1988.

Gulgunji Ramachandra Bhat, "Chemical Modification of Cotton Carpet Yarns," Raleigh, 1972.

Bernard Ridgway, *Carpet Review Weekly*, "New Ideas at Heimtex," Feb. 7, 1980.

Lisa D. Wendlinger, *Testiles Report*, "Cotton Sails into New Areas," Apr. 30, 1990.

D. N. Joshi, *The Indian Textile Journal*, "Indian Carpets," Mar. 1983.

Abstract of news articles, "Cotton Sails Into New Areas" (Apr. 30, 1990) and The Fashion–Driven Floor, (Nov. 1987).

Abstract of patents, 86–215374/33, Dynic Corp, 18.12.84–JP–265439 (04.07:86) D03d–01 D03d–15.

*Primary Examiner*—Jeff H. Aftergut
*Assistant Examiner*—Sam Chuan Yao
*Attorney, Agent, or Firm*—Nixon & Vanderhye P.C.

[57] ABSTRACT

A cotton room-size rug, having dimension between 3 feet×5 feet, and 12 feet×15 feet, is made from a heat set blend of about 70–90% cotton fibers and about 30–10% low melting temperature polyester fibers. The polyester impregnates the cotton fibers to give them enhanced properties. The fibers are tightly tufted to a primary backing, and latex adhesive connects the primary backing to an open weave polypropylene secondary backing. A stain resistant finish is applied and the sides serged, and fringe attached. A cabled 3.0/2/2 yarn configuration is preferred.

19 Claims, 1 Drawing Sheet

PROCESS OF MAKING COTTON ROOM-SIZE RUGS

BACKGROUND AND SUMMARY OF THE INVENTION

Cotton is perceived by consumers to provide high quality, pure, durable and easy-to-care-for products. Despite this perception, however, heretofore room-size cotton rugs have not been successfully marketed in the United States, even though cotton bath rugs, accent rugs and large area rugs have reportedly been made in other countries. The lack of success of such rugs in the United States is due, at least in significant part, to lack of dimensional stability, durability and style, and ease of soiling.

According to the present invention, it is possible to make room-size, all-cotton rugs (e.g., sizes comparable to quadrate rugs between 3 feet×5 feet and 12 feet×15 feet) that are dimensionally stable, durable and stylish and may be readily cleaned with a mild liquid detergent followed by a hot water rinse. One of the major features that provides this result is the impregnation of the cotton fibers by a small amount of low-melting temperature polyester.

According to one aspect of the present invention, room-size rugs, e.g., between 3 feet×5 feet and 12 feet×15 feet, are provided which comprise the following elements: A heat set blend of primarily cotton fibers with low melting temperature polyester impregnating the cotton fibers, the polyester of sufficient proportions and distribution to give the cotton fibers enhanced resilience, strength, and resistance to crushing, pilling and fuzzing when used as a rug. A so primary backing supporting the blend of primarily cotton fibers with properties-enhancing polyester fibers; and a secondary backing supporting the primary backing.

The primary backing is preferably polypropylene, and the secondary backing is an open-weave polypropylene laminated by latex adhesive to the primary backing. The heat-set blend preferably consists essentially of about 70–90% cotton fibers (preferably about 80% cotton fibers) and about 30-10% polyester fibers (about 20% preferred) having a melting temperature of about 250° F. or less. A fluorocarbon water and stain repellent finish is preferably provided on the heat-set blend of cotton impregnated with polyester. The cotton rug may be spot cleaned by moistening with water and padded dry without discoloration or shrinkage.

The invention also relates to a method of making cotton room-size rugs. The method comprises the steps of substantially sequentially: (a) Spinning about 70–90% cotton fibers with about 30-10% low melting temperature polyester fibers (about 20% preferred), to produce blended yanks. (b) Heat setting the polyester fibers in the blended yanks without harming the cotton fibers so that the cotton fibers are impregnated, reinforced, and strengthened by the polyester. (c) Tufting the blended yarns into a primary rug backing web. (d) Attaching the primary backing web to a secondary backing web to produce a rug web. And, (e) cutting the rug web into individual room sized rugs, each having a surface area corresponding to quadrate rugs having dimensions of between about 3 feet×5 feet and 12 feet×15 feet.

Step (a) is typically practiced by spinning the cotton and polyester fibers into 3.0/1 yarns, and there is the further step, between steps (a) and (b), of ply twisting the yarn into 3.0/2 yarns. Also, there are preferably the further steps between steps (b) and (c) of space dyeing the yarns and cabling the yanks into a 3.0/2/2 configuration.

Step (c) is typically practiced by tufting the yarns into a polypropylene primary backing, and step (d) is practiced by laminating the primary backing to an open-weave polypropylene secondary backing. There are also preferably the further steps, between steps (d) and (e), of foam coating the face of the rug web (opposite the secondary backing) with a fluorocarbon, water and stain repellent finish, and drying/curing the finish. There are also the further steps, between steps (a) and (b), of washing and/or bleaching the yarn and ply-twisting the yarn.

Step (e) is typically practiced to cut the rug web into quadrate rugs having four sides, and there are the further steps, after step (e), of serging the rugs on all four sides and attaching fringes to at least two sides.

The invention also comprises a room-size cotton rug produced by the steps (a) through (e) as set forth above.

It is a primary object of the present invention to produce room-size cotton rugs having good dimensional stability, durability and style, as well as good soil resistance, being able to be easily cleaned with a mild liquid detergent and rinsed with hot water without losing their appearance. This and other objects of the invention will become clear from the inspection of the detailed description of the invention and from the appended claims.

DETAILED DESCRIPTION OF THE DRAWINGS

Figure 1:
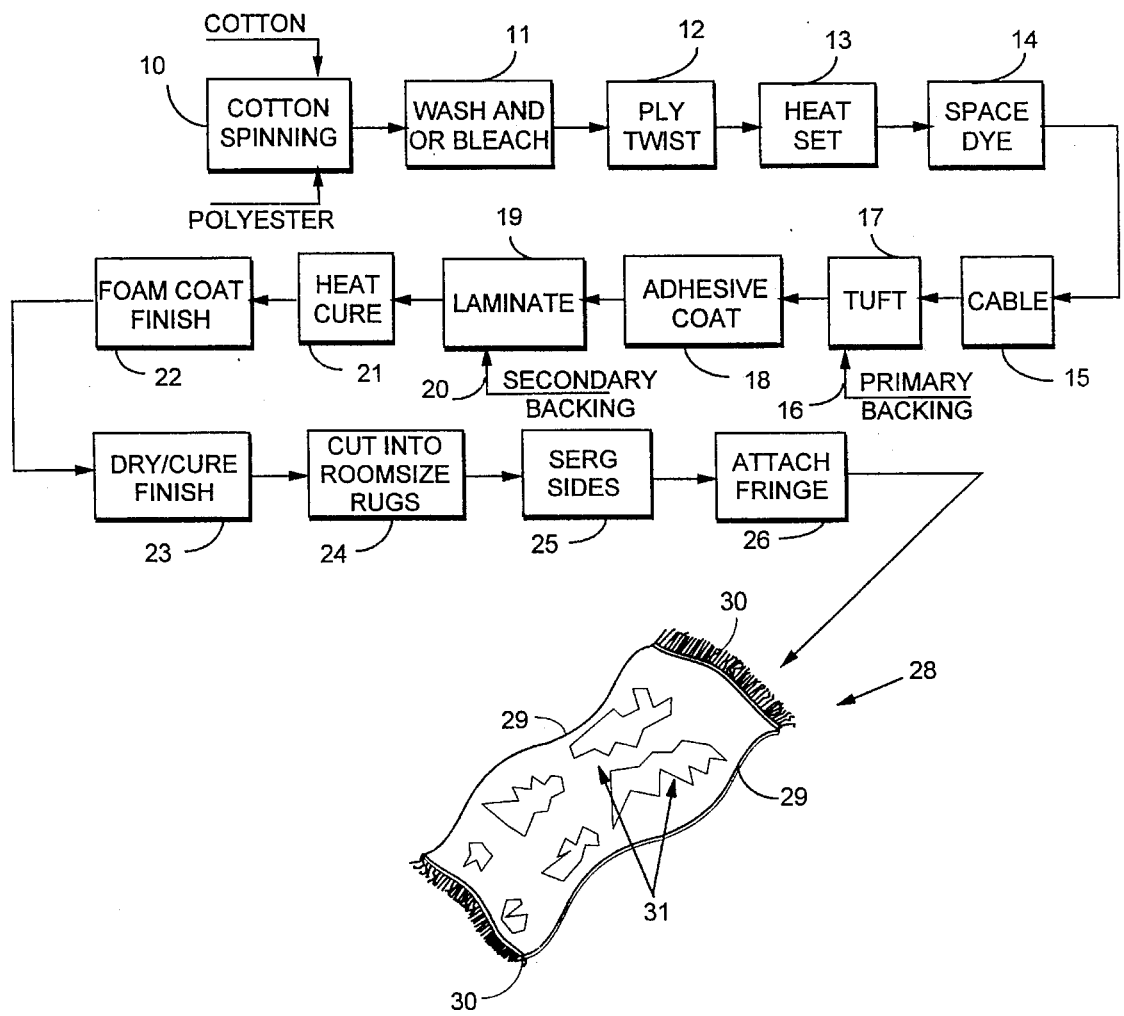
FIG. 1 is a schematic illustration of exemplary method steps that may be practiced according to the present invention.

FIG. 1 schematically illustrates an exemplary method for producing cotton room-size rugs according to the present invention. A blend of primarily cotton fibers and low-melting temperature polyester fibers are spun—as indicated schematically by box 10—into blended yarns. The amount of polyester is sufficient—when final yarns are produced—to impregnate, reinforce, and strengthen the cotton yarns so as to give them more resilience, strength and greater resistance to crushing, pilling, and fuzzing when subsequently tufted into a room-size rug. Also, surprisingly, the low-melting temperature polyester combined with the tight tufted construction that is provided according to the invention not only fortifies the cotton yarn and makes it more durable, it also enables the resistant rug to meet government flammability standards.

Preferably, the cotton fed to the spinning stage 10 is 70–90% of the total fiber, preferably about 80%, while the polyester is 30-10%, preferably about 20%. In the stage 10, the fibers are spun into 3.0/1 (three singles) yarn. The yarn is then typically washed and/or bleached in a conventional manner as illustrated by box 11 in so FIG. 1, and then the 3.0/1 yarns are ply twisted into 3.0/2 (three doubles) yarns as indicated by box 12 of FIG. 1. The yarns are then heat set—as indicated at stage 13 in FIG. 1—to melt the polyester component. Typically the heat-setting stage 13 is accomplished at a temperature of about 275° F. or less, so that the cotton fibers are not harmed during the heat-setting process. Heat setting may be accomplished in an autoclave or in commercially available heat setting equipment, such as those sold under the trademarks "SUPERBA™" or "SUESSENT™". The melting of the polyester component has the effect of impregnating, reinforcing, and strengthening the cotton fibers, giving the resultant 100% cotton fiber yarn more resilience, strength and greater resistance to crushing, pilling and fuzzing when subsequently tufted into a room-size rug.

Following heat setting in stage 13, preferably the yarns are space dyed as indicated at stage 14 in FIG. 1, for example, using a knit-de-knit process with short print spacing. Then—as indicated by stage 15 in FIG. 1—the 3.0/2 yarns are cabled into a 3.0/2/2 configuration.

The 3.0/2/2 yarns are tufted (preferably with a tight tufting configuration) into a polypropylene primary backing web, indicated at 16 in FIG. 1, using conventional tufting equipment in stage 17. The primary backing 16 is preferably the type used for nylon broadloom carpets, and may be constructed in a variety of patterns, typically in a twelve-foot width. The tufted primary backing is then typically coated on the backside with latex adhesive—as indicated at 18 in FIG. 1—and then laminated—as indicated at 19 in FIG. 1—to a secondary backing 20. The secondary backing supplied at 20 is preferably an open weave polypropylene secondary so backing which becomes embedded in the latex adhesive applied at stage 18. The adhesive is then heat cured in a conventional manner—as indicated at stage 21 in FIG. 1.

It is highly desirable to provide a repellent finish on the fibers. This is typically accomplished—as indicated at stage 22 in FIG. 1—by foam coating the face side of the rug (containing the tufts, opposite the backing) with a fluorocarbon, water and stain repellent finish, such as Scotchgard® from 3M Company of Minneapolis, Minn. The finish fortifies the cotton, makes it stain repellent, more durable, and more flame retardant. The finish applied at stage 22 is dried/cured in a conventional manner as indicated at box 23 in FIG. 1.

After the finish is dried/cured, the resulting carpet web is cut into conventional room-size rug dimensions. This is indicated by station 24 in FIG. 1. Usually, the rug web will be cut into quadrate configurations having dimensions which range from about 3 feet×5 feet to 12 feet×15 feet. Typical sizes that would be produced are 4 feet×6 feet, 6 feet×9 feet, 9 feet×12 feet, 8 feet×11 feet 3 inches, and 12 feet×15 feet. While quadrate configurations are preferred, oval, circular, or other shapes can be cut at station 24.

Once the room-size rugs are cut, they are typically serged on all four sides as indicated at station 25 in FIG. 1, and decorative fringes are attached to at least two opposite sides thereof, (in some cases all four sides), as indicated by station 26 in FIG. 1. The room-size rug produced according to the method of FIG. 1 is shown schematically by reference numeral 28 in FIG. 1 having two sides 29 which are merely serged, decorative fringes 30 at opposite ends, and a face 31 with a decorative pattern.

After the rugs 28 are constructed, typically they are labeled, wrapped and packaged for shipment to a retail outlet or the like, or directly to the customer. The rugs 28 have dimensional stability, durability, and are stylish, as well as having good soil resistant and stain resistant properties. Because of the provision of the polyester which impregnates the cotton fibers, and also because of the tight tufted construction, the rug 28 meets government flammability standards. Also, it can be spot cleaned with water and padded dry without discoloration, shrinkage or loss of its attractive appearance. Alternatively, it can be cleaned with a mild liquid detergent and rinsed with hot water.

Figure 2:
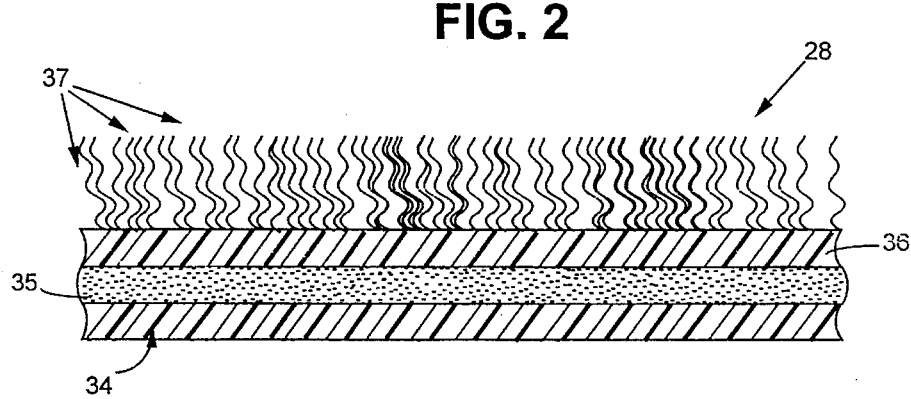
FIG. 2 is a schematic side cross-sectioned view of an exemplary rug according to the present invention.

Details of the carpet 28 are schematically illustrated in FIG. 2. The carpet of FIG. 2 has a secondary backing 34 of open-weave polypropylene, cured latex adhesive 35 holding the secondary backing 34 to the polypropylene primary backing 36, and tufted yarns 37 held within the primary backing 36. Each of the tufted yarns 37 preferably is cotton with sufficient proportions and distribution of heat-set polyester to give the cotton fibers enhanced resilience, strength, and resistance to crushing, pilling and fuzzing when used as a rug. Most desirably, the tufted yanks 37 have a 3.0/2/2 cabled configuration, being formed from a blend of cotton fibers and low-melting temperature polyester fibers which are spun into 3.0/1 (3 singles) yarn and then treated as described in FIG. 1, being ply twisted into 3.0/2 yarns, and cabled after space dyeing.

It will thus be seen that according to the present invention, an advantageous all-cotton room-size rug has been provided which has excellent dimensional stability, durability, style, and soil resistance. While the invention has been described in connection with what is presently considered to be the most practical and preferred embodiment, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of making cotton room sized rugs, comprising the steps of substantially sequentially:
   (a) spinning about 70–90% cotton fibers with about 30-10% low melting temperature polyester fibers, to produce blended yarns;
   (b) heat setting the polyester fibers in the blended yarns without harming the cotton fibers so that the cotton fibers are impregnated, reinforced, and strengthened by the polyester;
   (c) tufting the blended yarns into a primary rug backing web;
   (d) attaching the primary backing web to a secondary backing web to produce a rug web; and
   (e) cutting the rug web into individual room sized rugs, each having a surface area corresponding to quadrate rugs having dimensions of between about 3 feet×5 feet and 12 feet×15 feet.

2. A method as recited in claim 1 wherein step (a) is practiced by spinning the cotton and polyester fibers into 3.0/1 yarn.

3. A method as recited in claim 2 wherein step (b) is practiced at a temperature of 275 degrees F. or less.

4. A method as recited in claim 2 wherein step (e) is practiced to cut the rug web into quadrate rugs having four sides; and comprising the further steps, after step (e), of serging the rugs on all four sides, and attaching fringes to at least two sides.

5. A method as recited in claim 2 wherein step (c) is practiced by tufting the yarns into a polypropylene primary backing, and wherein step (d) is practiced by laminating the primary backing to an open weave polypropylene secondary backing, and comprising the further steps, between steps (d) and (e), of foam coating the face of the rug web, opposite the secondary backing, with a fluorocarbon water and stain repellant finish, and drying/curing the finish.

6. A method as recited in claim 2 comprising the further steps, between steps (a) and (b), of: washing and/or bleaching the yarn; and ply twisting the yarn.

7. A method as recited in claim 2 comprising the further step, between steps (a) and (b), of ply twisting the yarn into 3.0/2 yarns.

8. A method as recited in claim 7 comprising the further steps, between steps (b) and (c), of space dyeing the yarns, and cabling the yarns into a 3.0/2/2 configuration.

9. A method as recited in claim 8 wherein step (c) is practiced by tufting the yarns into a polypropylene primary backing, and wherein step (d) is practiced by laminating the primary backing to an open weave polypropylene secondary backing.

10. A method as recited in claim 9 comprising the further steps, between steps (d) and (e), of foam coating the face of the rug web, opposite the secondary backing, with a fluorocarbon water and stain repellant finish, and drying/curing the finish.

11. A method as recited in claim 1 wherein step (b) is practiced at a temperature of 275 degrees F. or less.

12. A method as recited in claim 1 wherein step (e) is practiced to cut the rug web into quadrate rugs having four sides; and comprising the further steps, after step (e), of serging the rugs on all four sides, and attaching fringes to at least two sides.

13. A method as recited in claim 12 wherein step (b) is practiced at a temperature of 275 degrees F. or less.

14. A method as recited in claim 1 wherein step (c) is practiced by tufting the yarns into a polypropylene primary backing, and wherein step (d) is practiced by laminating the primary backing to an open weave polypropylene secondary backing, and comprising the further steps, between steps (d) and (e), of foam coating the face of the rug web, opposite the secondary backing, with a fluorocarbon water and stain repellant finish, and drying/curing the finish.

15. A method as recited in claim 14 wherein step (b) is practiced at a temperature of 275 degrees F. or less.

16. A method as recited in claim 14 wherein step (e) is practiced to cut the rug web into quadrate rugs having four sides; and comprising the further steps, after step (e), of serging the rugs on all four sides, and attaching fringes to at least two sides.

17. A method as recited in claim 1 comprising the further steps, between steps (a) and (b), of: washing and/or bleaching the yarn; and ply twisting the yank.

18. A method as recited in claim 17 wherein step (b) is practiced at a temperature of 275 degrees F. or less.

19. A method as recited in claim 17 wherein step (e) is practiced to cut the rug web into quadrate rugs having four sides; and comprising the further steps, after step (e), of serging the rugs on all four sides, and attaching fringes to at least two sides.

* * * * *